United States Patent [19]
Bellec

[11] Patent Number: 5,796,730
[45] Date of Patent: Aug. 18, 1998

[54] RADIO COMMUNICATION SYSTEM WITH A DISPLACED RADIO STATION

[75] Inventor: Martial Bellec, Pleumeur Bodou, France

[73] Assignee: U.S. Philips Corporation, New York, N.Y.

[21] Appl. No.: 556,365

[22] Filed: Nov. 13, 1995

[30] Foreign Application Priority Data

Nov. 15, 1994 [FR] France .................... 94 13640

[51] Int. Cl.$^6$ .................................... H04Q 3/60
[52] U.S. Cl. .................................... 370/347; 370/434
[58] Field of Search .................... 370/280, 336, 370/337, 345, 347, 350, 434, 442, 528, 540

[56] References Cited

U.S. PATENT DOCUMENTS

| | | | |
|---|---|---|---|
| 4,002,846 | 1/1977 | Barbier | 370/528 |
| 4,726,020 | 2/1988 | Fino et al. | 370/434 |
| 5,375,122 | 12/1994 | Soupirot et al. | 370/95.1 |
| 5,511,073 | 4/1996 | Padovani et al. | 370/528 |
| 5,555,260 | 9/1996 | Rinnbäck et al. | 370/347 |
| 5,568,490 | 10/1996 | McNinch et al. | 370/347 |

OTHER PUBLICATIONS

"Systeme Herzien de raccordement d'abonnes IRT 2000" M. de Couesnongle, G. Floury and R. Tanguy, published in the Journal Commutation & Transmission nr. 1, 1988.

Primary Examiner—Benedict V. Safourek
Attorney, Agent, or Firm—Arthur G. Schaier

[57] ABSTRACT

A radio communication system comprises at least a base station which is remote from a concentrator to which it is linked by a channel. The base station is intended to exchange via a radio link, at a first rate, radio frames with terminals while the radio frames are multiplexed on a channel frame to be transported by the channel at a second rate. In accordance with the invention, multiplexing is effected to minimize a resulting delay, to maximize a permitted transmission delay and thus maximize the range of base stations.

9 Claims, 4 Drawing Sheets

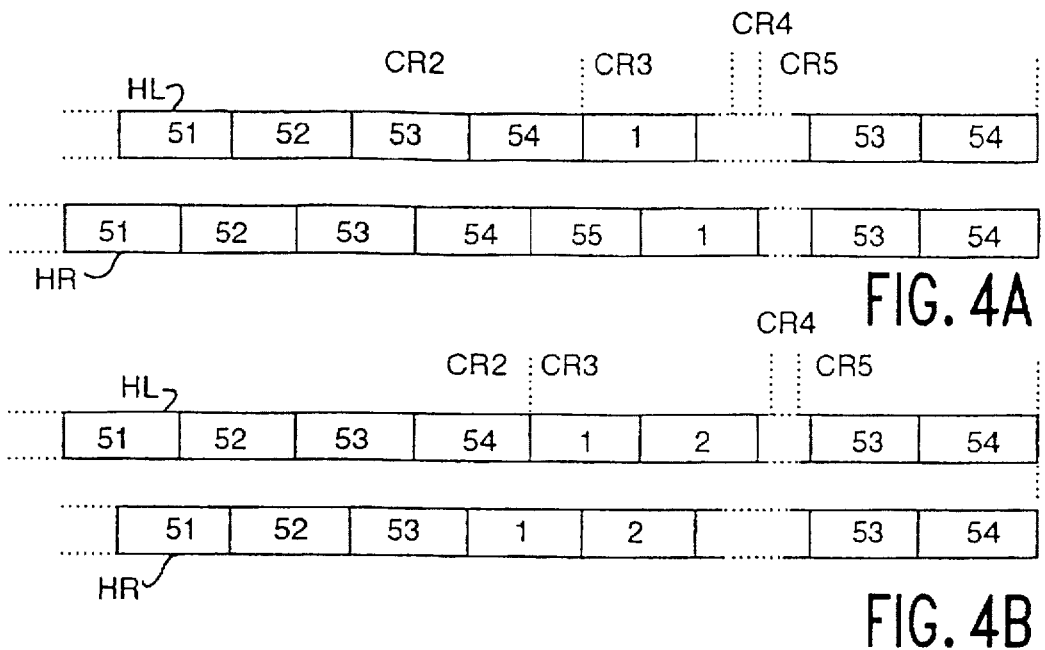
FIG. 4A
FIG. 4B
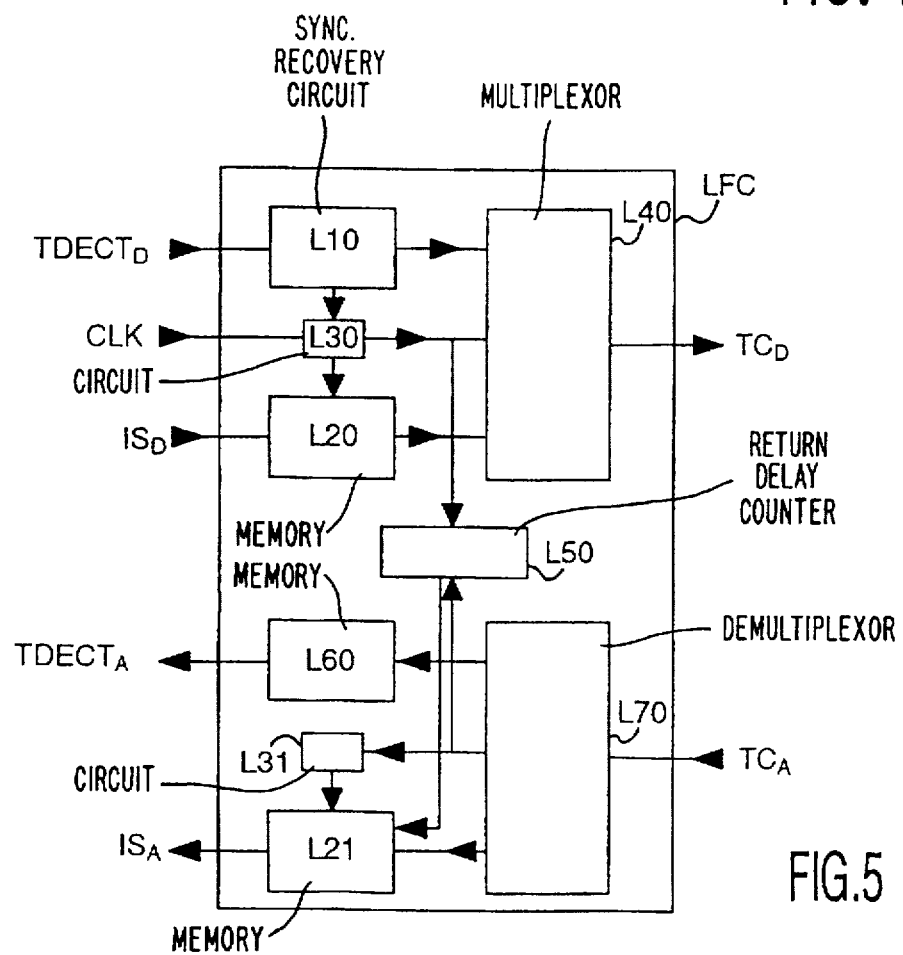
FIG. 5

1

RADIO COMMUNICATION SYSTEM WITH A DISPLACED RADIO STATION

BACKGROUND OF THE INVENTION

1. Field of the Invention

The invention relates to a radio communication system comprising at least one radio station intended to be displaced from a concentrator to which it is connected via a channel, said radio station is intended to exchange frames called radio frames by radio link at a first rate, and said channel is intended to transport, at a second rate, frames called channel frames on which said radio frames are multiplexed.

The invention likewise relates to a radio station intended to be used in a radio communication system for exchanging frames called radio frames by radio link at a first rate, and comprising means for being connected via a channel to a concentrator of said system, while said channel is intended to transport, at a second rate, frames called channel frames on which said radio frames are multiplexed.

Finally, the invention also relates to a concentrator intended to be used in a radio communication system while being connected via a channel to at least a radio station that exchanges frames called radio frames by radio link at a first rate, while said channel is intended to transport, at a second rate, frames called channel frames on which said radio frames are multiplexed.

The invention has important applications to radio communications, especially applications in which the radio stations are to cover a relatively wide geographical area.

2. Discussion of the Related Art

The article "Système Herzien de raccordement d'abonnés IRT 2000" by M. de Couesnongle, G. Floury and R. Tanguy, published in the journal Commutation & Transmission nr. 1, 1988, describes a system in which, in conformity with that which has been described in the opening paragraph, a radio station is displaced from a central radio station which plays the role of concentrator.

However, the displacing of a base station that directly exchanges radio frames with terminals by connecting them via a channel to a concentrator poses a particular problem, especially in radio communication systems based on the DECT standard, for applications in which the radio base stations are to cover a relatively wide geographical area, for example, for applications in which subscribers are connected in a wireless manner to a public telecommunications network.

In fact, in this case the typical range of a radio base station is 5 km (which may be considered a long range as against applications called telepoint applications which permit a pedestrian to move within a zone and for which applications the maximum required range for a radio base station is 200 m).

In the case of long-range applications, the transmission times may cause a certain return delay in the data reception, and a guard interval between the various time slots of the DECT frame is provided for this purpose by the standard.

When a system as described in the opening paragraph is used between a radio base station and a concentrator for applications which require long-range radio base stations, the problem posed is to minimize the delay with which the data are put in frames to be transported by the channel that connects the concentrator and the radio base station, so that the permitted transmission delay and thus the range of the base stations is maximized.

SUMMARY OF THE INVENTION

Therefore, a radio communication system according to the invention and as described in the opening paragraph is characterized in that said radio station, being a radio base station intended to exchange said radio frames with terminals, and, with the ratio between said first and second rate being equal to D1/D2, said radio base station and said concentrator comprise means for:

reading the bits contained in the received radio frames, distributing over a group of D2 bits of a channel frame, D1 bits of a radio frame and D2–D1 bits intended to be used for the coding of operational data, inserting a code bit of said operational data after a bit of the radio frame when the next bit of the radio frame has not been read completely.

In a particularly advantageous embodiment, when the radio communication system according to the invention is based on an architecture of the TDMA type (Time-Division Multiple Access) according to which each time slot of the radio frame is assigned to a particular radio link, said operational data particularly comprise, when there is a transmission from the concentrator to the radio base station, control data of that particular radio link, while said base station and said concentrator comprise means for inserting the control data of a radio link that corresponds to a time slot k at the latest into the packets of the channel frame that correspond to time slot k−2.

Thus, the control data of the radio link are transmitted to the radio station beforehand, so that the synthesizer has enough time (at least one time slot) to prepare itself for the radio transmission of the bits of the received radio frames (locking on to the carrier frequency used for the transmission, selection of the antenna . . . ). This embodiment provides the advantage of using slower, and thus less costly synthesizers at the radio base station.

In a particularly advantageous embodiment, a radio base station according to the invention thus comprises two synthesizers which operate alternately to process said time slots.

The alternate use of two synthesizers to process the successive time slots makes it possible to use slower, and thus less costly synthesizers while the use of successive time slots for transmissions (transmission or reception) with different carrier frequencies is permitted.

BRIEF DESCRIPTION OF THE DRAWINGS

These and other aspects of the invention will be apparent from and elucidated with reference to the embodiments described hereinafter.

In the drawings:

FIG. 5 is a diagram of a frame control module of a concentrator according to the invention.

DESCRIPTION OF PREFERRED EMBODIMENT

In the following of the description, an exposé will be given of a radio communication system based on the DECT standard, but the invention is naturally also applicable to other types of radio communication systems. To facilitate comprehending of the exposé, the notations used hereafter are those of the DECT standard whenever possible.

Figure 1:
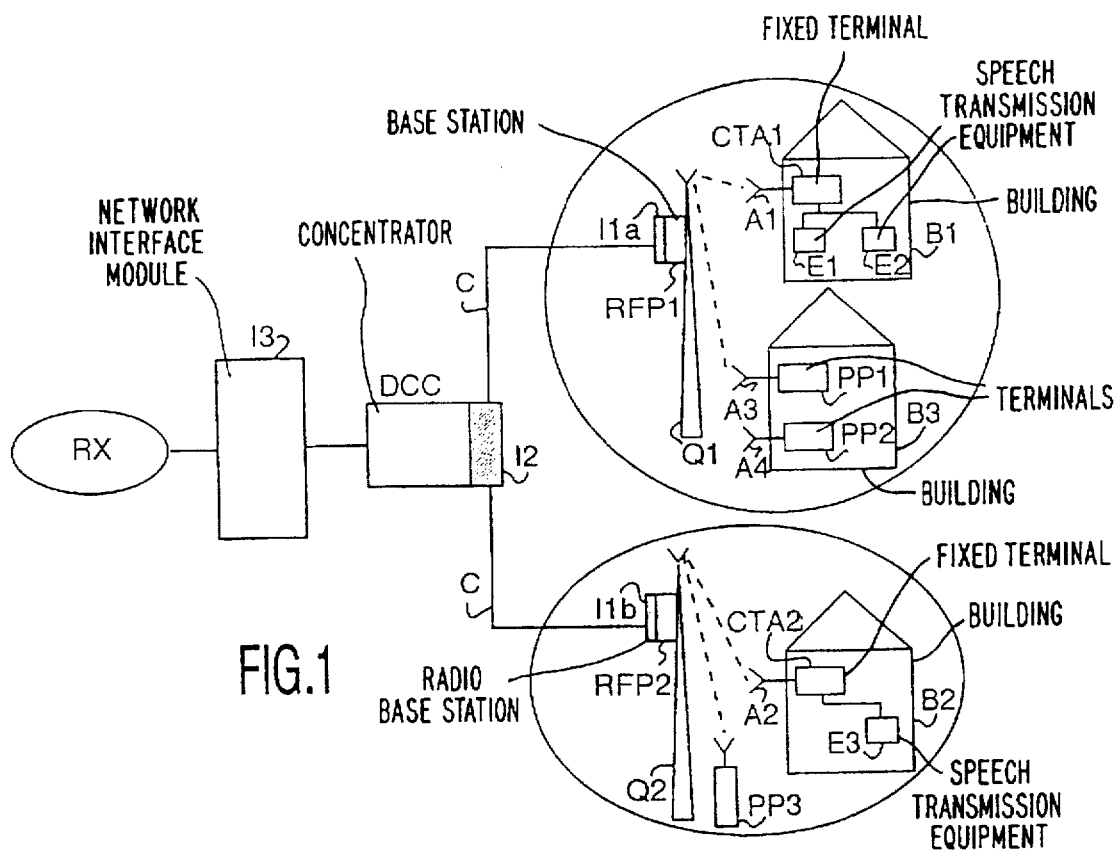
FIG. 1 diagrammatically shows a radio communication system according to the invention.

A radio communication system according to the invention is shown in FIG. 1. On the one hand, it comprises two fixed terminals CTA1 and CTA2 installed in two buildings B1 and B2, each having an aerial A1 and A2, and connected to speech transmission equipment (telephones of facsimiles, for example) E1 and E2, and E3, respectively. The terminals PP1 and PP2 are fixed terminals dedicated to data transfer and are installed in a building B3 and have an aerial A3 and A4, respectively. Terminal PP1 supports the ISDN services and Terminal PP2 is an Ethernet adapter intended to be connected to a wireless local area data network of the Ethernet type. Finally, the terminal PP3 is a portable terminal supporting the speech services.

A radio communication system according to the invention further comprises two radio base stations RFP1 and RFP2 (Radio Fixed Part) installed, respectively, at the top of a pylon Q1 and Q2, and connected to a DCC concentrator (DECT Cluster Controller) by a cable C via interfaces I1A and I2 on the one hand, and I1B and I2 on the other. The DCC concentrator is further connected via a network interface module I3 to a network RX which, for speech transmission applications, is for example a public switched network, and for data transfer applications, a network of the Ethernet type.

A communication may thus be established between radio base station RFP1 and terminals CTA1, PP1 and PP2, on the one hand, and between the radio base station RFP2 and terminals CTA2 and PP3, on the other.

Figures 3A, 3B, 3C:
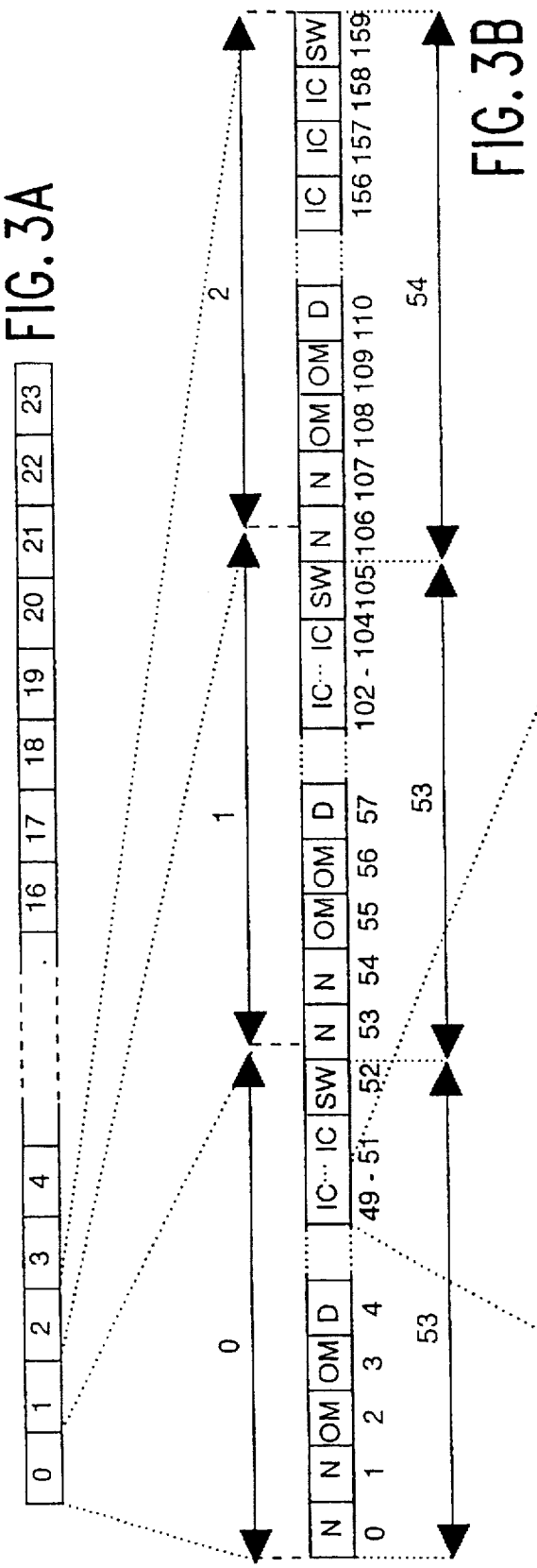

Before continuing the description, it seems necessary to recall the basic modes of operation of the DECT standard. The DECT standard (ETS 300 175-2 of ETSI) provides, as shown in FIG. 3-A, that each DECT frame is divided into 24 time slots of 10 ms each. Its rate is 1.152 Mbit/s which means that each time slot corresponds to 480 bits. Various DECT packet structures are defined by the standard referenced P00, P32 and P80.

They contain 96 bits, 424 bits and 904 bits respectively, so that a time slot of the DECT frame comprises a packet P00, a P32 packet and half P80 a packet, a guard time of 56 bits being saved for the delay due to the transmission in the time slots which carry DECT P32 and P80 packets. Each DECT packet has a synchronization field followed by a data field which contains redundancy bits for the protection of the data.

Any time slot of the DECT frame can be used on transmission and on reception. In the case of speech applications, which are considered symmetrical as regards the volume of exchanged data, one preferably uses P32 packets, and each communication generally occupies two time slots: the first time slot relates to the communications from the base station to the fixed terminal, whereas the second time slot, which is 5 ms later in the frame, conveys the information in reverse direction. On the other hand, for the data transfer applications which generate higher rates and which are in most cases asymmetrical, it is possible to use generally P32 or P80 packets, and each communication is capable of containing any number of time slots on transmission and on reception.

Finally, the spectrum assigned to the DECT system nowadays has 10 carriers.

Figure 2:
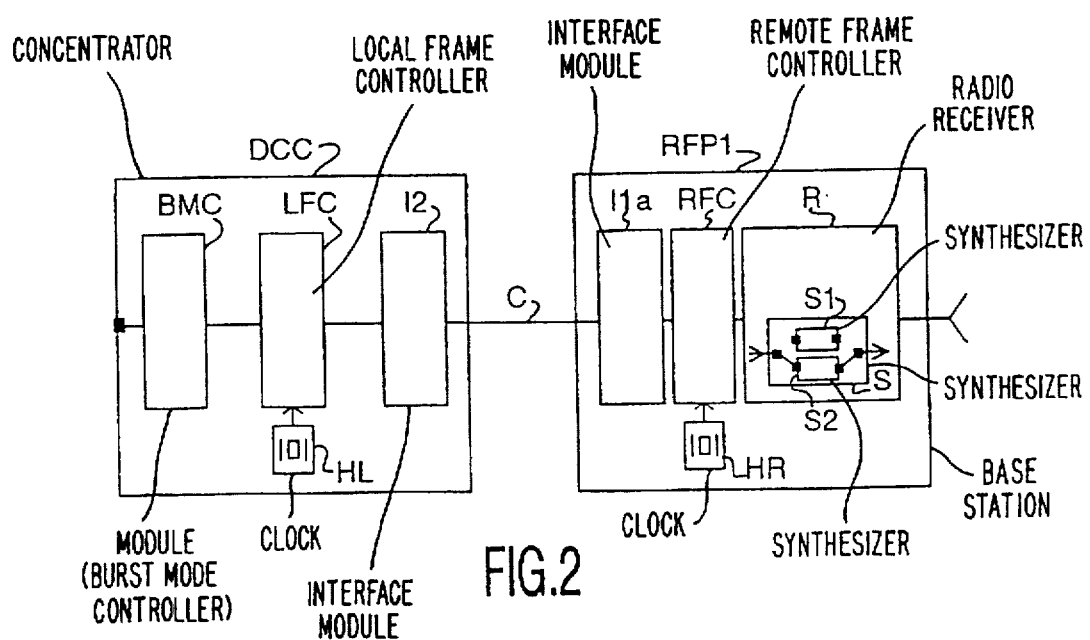
FIG. 2 is a diagram representing the interconnection between a radio base station and a concentrator, FIG. 3-A represents a DECT frame, FIG. 3-B represents a part of a channel frame, FIG. 3-C represents in a diagram the multiplexing of a radio frame (DECT frame) at 1.152 Mbit/s on a channel frame (cable frame) at 2.048 Mbit/s, FIGS. 4-A and 4-B represent a correction of the slip caused by the shift of timing between the concentrator and the base station.

FIG. 2 gives a diagrammatic representation of the interface between a radio base station RFP1 and a concentrator DCC which have each a clock HR and HL, respectively. They are connected each to a cable C which has a rate of 2.048 Mbit/s via a physical interface module denoted I1a and I2, respectively, which is in accordance with recommendation G703 of CCITT. These G703 interface modules are realised, for example, by the Siemens IPAT2 circuit. Interface module I1a of base station RFP1 is connected to a frame control module RFC which itself is connected to a radio transceiver R which comprises a synthesizer S which synthesizer, in this embodiment, is formed by two synthesizers S1 and S2 which operate alternately. The role of the frame control module RFC (Remote Frame Controller) is:

on transmission, to multiplex the DECT frames at 1.152 Mbit/s received via radio receiver R on a frame of 2.048 Mbit/s intended to be transmitted by cable C, then to code the frame thus obtained according to the HDB3 code, and on reception, to decode the frame received from frame controller DCC, then to demultiplex the frame at 2.048 Mbit/s so as to obtain the corresponding DECT frame which is then transmitted to radio transmitter R.

Similarly, interface module I2 of concentrator DCC is connected to a frame control module LFC (Local Frame Controller) which itself is connected to a module BMC (Burst Mode Controller) for controlling the DECT frame. The role of frame control module LFC is:

on reception, to decode the data received on interface I2 and demultiplex the frame of 2.048 Mbit/s into a DECT frame of 1.152 Mbit/s, and on transmission, to multiplex a received DECT frame coming from module BMC to a frame of 2.048 Mbit/s and then to code the latter frame according to code HDB3.

Module BMC is provided, for example, on the basis of a circuit PCD504X manufactured by Philips Semiconductors. The main functions of this circuit are the following:

multiplexing and demultiplexing the DECT frames at 1.152 Mbit/s (that is to say, in essence, recuperating DECT packets from the synchronization field, multiplexing the data, calculating cyclic redundancy in these data, and storing the received data of module LFC), controlling the MAC layer of the DECT protocol (that is to say, in essence establishing, maintaining and clearing the channels).

FIG. 5 describes in a more detailed manner a frame control module LFC. Such a module comprises, on the one hand:

a synchronization recovery circuit L10, which receives in its input DECT frames denoted TDECT$_D$ transmitted by the module BMC and intended for the radio base station (the index D indicates that it is a downgoing frame, that is to say, transmitted by the concentrator to the base station), a circuit L30, which is a time base formed by three counters, a bit counter, a time slot counter and a frame counter. This circuit receives on a first input clock signals CLK which correspond to the time slot synchronization and the frame synchronization applied thereto by the module BMC, and on a second input a bit synchronization signal coming from circuit L10, a memory L20, intended to store signalling data denoted IS$_D$ which are transmitted thereto by the module BMC and which will be described in the following of the exposé. The signalling data to be transmitted depend on the number of the current time slot in the frame; memory L20 thus reads the time slot counter of circuit L30 to determine the data it is to transmit.

a multiplexing circuit L40 for multiplexing signaling data which are applied thereto by the memory L20 and for multiplexing the $TDECT_D$ frame applied thereto by circuit L10. Circuit L40 reads the counters of circuit L30 in order to position in succession the signalling data and the bits of the DECT frame at the appropriate locations in the cable frame. This multiplexing function will be described in more detail in the following of the description. Circuit L40 finally produces a cable frame $TC_D$ which is transmitted on cable C intended for the base station.

Module LFC comprises, on the other hand:

- a synchronization recovery and demultiplexing circuit L70 which receives on an input a cable frame $TC_A$ coming from the radio base station (the index A indicates that it is an upgoing frame transmitted by the base station to the concentrator).
- a circuit L31 which generates a time-base in response to clock signals transmitted thereto by the circuit L70. This circuit L31 is formed by three counters, a bit counter, a time slot counter and a frame counter,
- a memory L21 intended to enter signalling data $IS_A$ transmitted thereto by the circuit L70 and which signalling data will be described in the following of the exposé. Memory L21 reads the time slot counter of circuit L31 in order to identify the received data,
- a memory L60 which records the $TDECT_A$ frame transmitted thereto by circuit L70 in order to transmit same to module BMC.

Finally, module LFC shown in FIG. 5 comprises a circuit L50 which is formed by a return delay counter. This circuit has access to, on the one hand, the state of the time slot counter of circuit L30 to initialize its return delay counter and, on the other hand, the state of the time slot counter of circuit L31 to stop its return delay counter. The role of this circuit will be explained in the following of the description.

Figure 6:
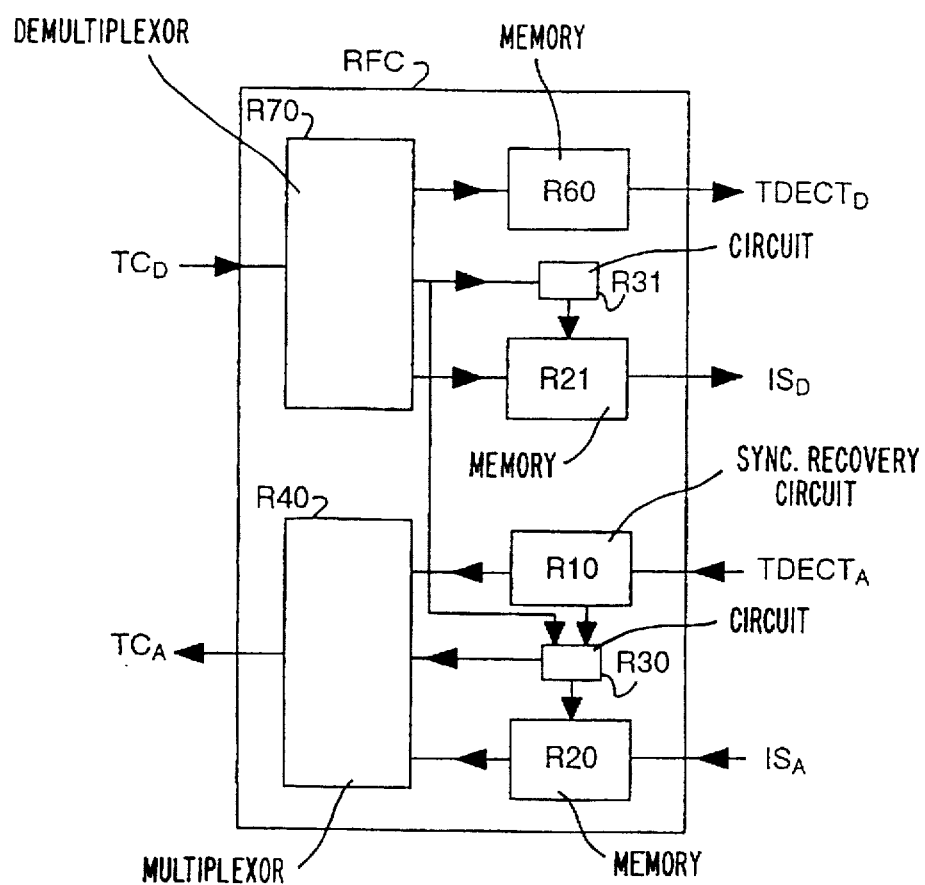
FIG. 6 is a diagram of a frame control module of a base station according to the invention.

FIG. 6 describes an RFC frame control module. Such a module comprises, on the one hand:

- a synchronization recovery and demultiplexing circuit R70, which receives on an input a cable frame $TC_D$ coming from the concentrator,
- a circuit R31, which generates a time-base in response to clock signals transmitted thereto by the circuit R70. This R31 circuit is formed by three counters, a bit counter, a time slot counter and a frame counter,
- a memory R21, intended to record signalling data $IS_D$ transmitted thereto by circuit R70 and which will be described in the following of the exposé. In order to identify the received data, memory R21 reads the time slot counter of circuit R31,
- a memory R60, which records the $TDECTD_D$ frame transmitted thereto by circuit R70 in order to transmit same to the radio transceiver of the radio base station.

Module RFC comprises, on the other hand:

- a synchronization recovery circuit R10, which receives on an input DECT frames denoted $TDECT_A$ transmitted by a terminal and intended to be transmitted to the concentrator,
- a circuit R30, which is a time-base formed on the basis of three counters, a bit counter, a time slot counter and a frame counter. This circuit receives on a first input clock signals that correspond to the time slot synchronization and frame synchronization transmitted thereto by circuit R31, and, on a second input, coming from circuit R10, a bit synchronization signal,
- a memory R20, intended to record signalling data denoted $IS_A$, created on the basis of the received $TDECT_A$ frame coming from the terminal and on the basis of the received $TC_D$ frame from the concentrator and to be described in the following of the exposé. The signaling data to be transmitted depend on the current time slot number in the frame; memory R20 thus reads the time slot counter of circuit R30 to determine which data are to be transmitted,
- a multiplexing circuit R40, for multiplexing signalling data applied thereto by memory R20 and for multiplexing the $TDECT_A$ frame applied thereto by circuit R10. This circuit L40 reads the counters of circuit L30 so as to position in succession the signalling data and bits of the DECT frame at the appropriate locations in the cable frame. This multiplexing function will be described in more detail in the following of the exposé. Circuit R40 finally produces a cable frame $TC_A$ which is transmitted on cable C to the concentrator.

In this embodiment, the channel used for connecting the base station to the concentrator is a 2.048 Mbit/s cable. But, alternatively, other types of channels may also be used.

FIG. 3-C describes the multiplexing of a DECT frame of 1.152 Mbit/s on a 2.048 Mbit/s cable frame, as is realised by circuits L40 and R40. The ratio D1/D2 between these two rates (DECT frame rate to cable frame rate) is equal to 9/16. 16 bits of the cable frame correspond to 9 bits of the DECT frame. In FIG. 3-C are represented on top of each other a group P2 of 16 bits (denoted 1 to 9 and A to G) of a cable frame and a group P1 of 9 bits (denoted 1 to 9) of a DECT frame. The arrows pointing away from each bit of group P1 indicate the instants at which the reading of the bit is accomplished, that is to say, the instants from which the bit is available. The bits A to G are used for coding the operational data which will be described in the following of the exposé.

For minimizing the framing delay, and thus maximizing the permitted return transmission delay, the DECT bits are inserted into the cable frame the moment they are available.

Thus, as shown in FIG. 3-C, the bit 1 is transmitted in group P2 once the bit has become available. When bit 1 is transmitted, bit 2 is not yet available. It is thus bit A that is transmitted in second position in group P2. Bit 2 is available during the transmission of bit A and can thus be transmitted thereafter, in third position in group P2. At the end of the transmission of bit 2, bit 3 is not yet available and it is bit B that is transmitted in fourth position in group P2. Bit 3 is available during the transmission of bit B and can thus be transmitted thereafter in group P2 in fifth position. The same reasoning may be followed for the bits C, 4, D and 5 which are thus transmitted in sixth, seventh, eighth and ninth position respectively, in group P2. At the end of the transmission of bit 5, bit 6 is available. It is thus immediately transmitted in tenth position. Then, the previous reasoning can be taken up again for the following bits E, 7, F, 8, G and 9 which are transmitted at eleventh, twelfth, thirteenth, fourteenth, fifteenth and sixteenth position, respectively.

Thus, 9 bits 1 to 9 of a DECT frame and 7 bits A to G intended to be used for the coding of operational data are spread over a group of 16 bits of a cable frame by inserting in succession one of the 7 bits A to G after a bit 1 to 9 when the next bit is not available, that is to say, when it has not yet been read.

The 7 bits A to G transmitted in each group P2 of 16 bits of the cable frame are used in two different ways during the transmission of a DECT time slot:

on the one hand, they are used for coding a time slot synchronization word denoted SW which takes two different values depending on whether an even or an odd time slot (0011011 or 1100100) is concerned. This synchronization word is controlled by circuits L40 and R40.

on the other hand, they are used for coding the signalling data IS coded in the first four bits A to D of each group P2, the next three bits E to G, which form a cyclic redundancy code of the Hamming code type protecting the first four data bits A to D. These signaling data are formed by:
→ operational and maintenance data OM,
→ control data IC of a radio link.
→ a time slot number N.

The time slot number N is a modulo-24 number (as each DECT frame has 24 time slots) transmitted for each time slot in order to ensure the frame synchronization between the radio base station and the concentrator. The number is applied to circuits L40 and R40 by circuits L30 and R30, respectively. The coding of the number takes place in 2 P2 groups of the cable frame (5 bits are indeed necessary and each P2 group makes it possible to transport 4 operational data bits).

Now the operational and maintenance data OM and the control data IC which are transmitted in the cable frames will be described, distinguishing between the case of transmissions from the concentrator to the radio base station, called downgoing transmissions, and the case where transmissions take place from the radio base station to the concentrator, called upgoing transmissions. Only certain data which appear essential to or particularly interesting for the implementation of the invention will follow here in the exposé by way of example. Needless to observe that other data can also be transmitted.

In the case of a downgoing transmission, the operational and maintenance data OM are transmitted by circuit L20 to circuit L40 and are notably formed by an activating/stand-by command from the radio base station and the concentrator, each encoded in 1 bit, the decisions on activating or stand-by mode being made by module BMC. The coding of these operational and maintenance data is thus made in 1 group P2 of the cable frame.

In the case of an upgoing transmission, the operational and maintenance data OM are formed by the following data:
the average level of the signal received by radio link for each time slot which is coded in 4 bits; this information is sampled on the basis of the received signal and entered in memory R20 which applies same to circuit R40,
diverse data which are transmitted for at least certain time slots; they relate to alarms transmitted by the radio base station and intended for being transferred by module LFC to module BMC to be processed. These diverse data are transmitted by way of:
→ two bits indicating the quality of the downgoing cable transmission during the last second, that is to say, the line bit error ratio which is identified relative to two thresholds: $10^{-5}$ and $10^{-3}$. Thereto, the received erroneous packets are detected by verifying the 3 cyclic redundancy bits E to G. They are thus accounted for by incrementing a 12-bit counter of circuit R31 for a duration of one second, that is to say, for 100 DECT frames, and thus for 128,000 packets P2. These two bits make it possible to indicate whether the value of the counter is higher than 128, lies between 1 and 128, or is zero. They are transmitted by circuit R31 to memory R20. These operational and maintenance data make it possible to trigger a maintenance action, for example, a calling of the radio base station and/or concentrator to the stand-by mode can be commanded by module BMC.

→ two bits indicating respectively a loss of frame synchronization and a loss of time slot synchronization, which are transmitted by circuit R31 to circuit R30.
→ two bits denoted D which, as will be seen in the following, are used for correcting a slip which is likely to occur at bit level between clocks HR and HL of the base station and of the concentrator.

The IC radio link control data are solely transmitted in the case of a downgoing transmission and are applied by module BMC to memory L20. These data are particularly formed by:

the type of packet carried in the time slot (P00, P32 or P80); this information is coded in 2 bits, the direction of transmission (reception or transmission) coded in 1 bit. Indeed, though this information can be derived directly from the location of the time slot in the frame for symmetrical applications, such as the speech transfer applications, it is not the same for asymmetrical applications, especially for file transfer applications, for which it must be possible to use whatever time slot of the frame in the transmit or receive mode, the active or inactive state of the time slot coded in 1 bit, which makes it possible to indicate whether the time slot is used or not for transmitting a communication, the number of the antenna to be used since the standard provides an antenna diversity mechanism based on the radio base station; this information is coded in 1 bit, the number of the carrier frequency to be used for the link as the standard provides ten carrier frequencies; this number is coded in 4 bits, and one bit which, when it is active for a time slot k, indicates that the time slot k+2 is to be considered a double time slot, that is to say, that the control data of the radio link transmitted for the time slot k+2 remain valid for the next time slot k+3. This bit makes it possible to transmit in packets of P80 format, defined by the standard for applications that require for a higher rate than speech transfer applications, especially for data transfer applications.

The coding of these data thus takes place in 3 P2 groups of the cable frame. However, these data are urgent data in this respect that they are to arrive at the radio base station in time, so that the synthesizer of radio transmitter R is ready for transmission when the DECT frame is received by the radio base station. Therefore, the radio link control data relating to time slot k are transmitted together with the operational maintenance data relating to time slot k−2. This feature makes it possible to guarantee the operation of the system, even when the synthesizers used are slow synthesizers. This feature makes it particularly possible to use two slow synthesizers S1 and S2 at the radio base stations which operate in alternating fashion for transmitting successive time slots.

The structure of P2 groups and the nature of the data coded in 7 bits A to G having been explained, the formation of the cable frame will now be described with the aid of FIG. 3-B.

The cable frame is formed by a succession of P2 groups; 160 of these groups denoted 0 to 159 are represented in FIG. 3-B; they correspond to time slots 0, 1 and 2 of the DECT frame shown in FIG. 3-A. Each time slot of the DECT frame compring 480 bits, 53 P2 groups and 3 DECT bits are necessary for their coding. The group structure of the cable frame is thus equal to the time slot structure of the DECT frame 160 groups, that is to say, every three time slots, thus forming a cycle of 53-53-54 groups. The time slot synchronization word SW is transmitted for each time slot in the last complete group that precedes the beginning of the time slot, that is to say, in groups 52, 105 and 159. The synchronization word thus makes it possible to find back the time slot synchronization without any shift for the time slot 0, with a shift by 3 DECT bits for the time slot 1 and a shift by 6 DECT bits for the time slot 2.

On the other hand, the two groups that follow this synchronization word, that is to say, the groups 0 and 1, 53 and 54, 106 and 107 are used for transmitting the number N of the time slot that is to say 0, 1 and 2 in this example. The groups that follow this time slot number are used for transmitting the either downward or upward operational and maintenance data OM 1 (with the exception of bits D). In the example described here, two groups are necessary for this transmission, groups 2 and 3, 55 and 56, 108 and 109. Additional groups may be necessary when different operational and maintenance data from those described hereinbefore are transmitted. However, it is important to note that for the upgoing transmissions, the four bits which are transmitted during the time slot k to indicate the mean level of the signal received by the radio link relate to the mean level of the signal received for the time slot k–2. This delay results from delays caused by the radio receiver R which samples the received signal, and from the delay necessary to put the information in frames.

For the downgoing transmissions, the IC radio link control data which relate to the time slots 2, 3 and 4 respectively, are transmitted in the three groups preceding the time slots 1, 2 and 3 synchronization word, that is to say, in groups 49 to 51, 102 to 104, 156 to 158. Indeed, the radio link control data must be transmitted previously, so that the radio receiver R is ready for transmission when it receives the DECT frame.

Finally, for the upgoing transmissions, the two bits D are transmitted following other operational and maintenance data in the groups 4, 57 and 110, respectively.

The role of these two bits D is the following. The standard G703 does not provide a wire for the transmission of clock signals between the two pieces of equipment on either end of the cable. Clock HR of the base station is thus free with respect to clock HL of the concentrator, so that it may provide a frequency shift with respect to the latter clock.

For upgoing transmissions, it is impossible to filter the jitter introduced at bit-level by the transmission and the putting into frames, with the conventional method using a phase-locked loop PLL without a considerable delay being created. The data received from the terminal by the radio base station are thus sampled with the local clock HR of the base station. This problem does not occur for frame and time slot clocks whose frequency is much lower and which the radio base station can thus recover from the data received from the concentrator. Worded differently, for upgoing transmissions, clock HR of the base station is thus the master clock at bit level and is slaved to the clock of the concentrator at time slot and frame-levels.

The length of the bits transmitted by the radio base station does not correspond of necessity to that of the concentrator-sampled bits, so that after a certain period of time the concentrator counts more or fewer bits than have been transmitted by the radio base station. Such a shift at bit level can be tolerated as long as the slip remains less than a P2 group, because the mechanisms of frame synchronization recovery and time slot synchronization recovery in the concentrator do not reach under the level of P2 group. By way of example, when considering that the clocks of the concentrator and of the base station operate at the respective frequencies of 18.432 NHz and $18.432 \pm 50.10^{-6}$ MHz, the frequency shift that is likely to appear is lower than 1000 Hz, thus 10 bits for 10 ms (duration of the DECT frame). Each frame packet that corresponds to 16 bits, one correction made twice per DECT frame, that is to say, every 5 ms, makes it thus possible to guarantee a slip lower than half the group.

According to the invention, the correction is made in the following manner: the radio base station compares its transmitting instants with the receiving instants coming from the concentrator and derives therefrom the slip between the two clocks. Every half frame, for example, for the time slots 11 and 23, the radio base station decides:

either to transmit in normal fashion the $54^{th}$ group of cycle 53, 53, 54 if there is no slip (D=00), or to transmit only 53 groups if the concentrator is at least half a group ahead compared to the base station (D=10), or to transmit an additional $55^{th}$ group if it is at least half a group behind (D=01), and to transmit the type of correction made, coded in the two bits D, later in the time slot that precedes this correction.

FIG. 4A represents a correction made in the case where the frequency of clock HR of the radio base station is higher than that of clock HL of the concentrator, while the concentrator is, in consequence, delayed by half a group compared to the base station. In this case an additional group 55 is transmitted, so that at the end of the next cycle 53-53-54, that is to say, at the end of the transmission of time slot CR5, the shift is compensated for.

Similarly, FIG. 4B represents a correction made in the case where the frequency of clock HR of the radio base station is lower than that of clock HL of the concentrator, while the concentrator is, in consequence, ahead of the base station by half a group. Group 54 of time slot CR2 is thus swallowed by the base station, so that at the end of the next cycle 53-53-54, that is to say, at the end of the transmission of time slot CR5, the shift is compensated for.

These bits D will furthermore be used by the concentrator for calculating a magnitude called return delay on the cable and which makes it possible to evaluate the length of the cable that connects the concentrator to the radio base station.

The calculation of this return delay by the concentrator is particularly important as it makes it possible to align the clock signals of the various radio base stations connected to the concentrator. Indeed, these stations generally have different distances to the concentrator, and the frames transmitted by the concentrator thus arrive there with different delays due to the travel. When a terminal is to change its radio base station, which either relates to a mobile terminal which has moved from one zone to another, or to a situation where a mechanism for changing channels between terminals as defined by the DECT standard has been triggered, it is not necessary that there is a resynchronization of frame and time slot with a new base station so that this change becomes transparent to the user. Therefore, it is important that, prior to the transmission of the frames, the concentrator can correct the differences of receiving instants at each radio base station. This correction is carried out by advancing the transmission instant of the frames intended for each radio base station as a function of the return delay to that particular station: the more remote the station is, the earlier the frames will be transmitted.

For calculating this delay it is usual to start a counter included in circuit L50, when a given time slot is transmitted and to stop the counter when said time slot is received. However, this mode of calculation does not take a possible slip into account between the clock of the radio base station and that of the concentrator. In fact, if this operation is effected for a time slot which comprises 53 or 55 groups instead of 54, it will be altered. Therefore, in accordance with the invention, it is provided to correct the instant at which said counter stops as a function of D. Thus, the return delay DAR is expressed in the following manner:

$$DAR = TA + X - TL$$

where

X=T if D=10, X=−T if D=01 and X=0 if D=00

T is equal to the transmission time of a P2 group,

TL is the instant at which said counter is started,

Ta is the instant at which said counter is stopped.

Albeit the invention has been described in accordance with a particular embodiment, it will be obvious that it is not restricted to this embodiment. The invention can particularly be applied to radio communication systems other than the DECT system. The radio station can retransmit by other means than a cable and at other rates than those used here.

I claim:

1. A radio communication system comprising:

a concentrator;

at least one radio station displaced from said concentrator and connected thereto via a channel;

at least one terminal in communication with said radio station;

means for said radio station to exchange radio frames at a first rate with said terminal, said radio frames comprising D1 bits;

means for said concentrator to exchange channel frames at a second rate with said radio station, said channel frames comprising D2 bits;

said radio frames being multiplexed on said channel frames and said ratio between the first rate and the second rate being equal to D1/D2, means for reading said D1 bits in said radio frames, means for distributing said D1 bits over said D2 bits of said channel frame;

means for coding operational data with D2-D1 bits; and means for inserting a code bit of said operational data in said radio frame after a selected bit and prior to completely reading a subsequent bit.

2. The radio communication system as claimed in claim 1, wherein the operational data are particularly:

synchronization data for the synchronization of said radio base station and said concentrator, operational and maintenance data, and, in the case of a transmission from said concentrator to said base station, control data for a radio link concerned.

3. A radio communication system as claimed in claim 2, further comprising an architecture of the TDMA type (Time-Division Multiple Access) in accordance with which each time slot of the radio frame is assigned to a particular radio link, wherein said radio base station and said concentrator further comprise means for inserting the control data of a radio link that corresponds to a time slot k at the latest into the groups of the channel frame that correspond to the time slot k−2.

4. A radio communication system as claimed in claim 3, wherein said radio base station further comprises at least two synthesizers which operate alternately to process said time slots.

5. A radio communication system as claimed in claim 2, wherein said base station further comprises a clock that oscillates freely relative to a clock of said concentrator, wherein said base station still further comprises means for:

regularly evaluating a shift between the clock of said base station and the clock of said concentrator, transmitting an additional group of D2 bits if the clock of said concentrator lags behind by at least half a group relative to that of said base station, and swallowing a group if the clock of said concentrator leads by at least half a group, so as to correct said shift, transmitting operational and maintenance data (D) to said concentrator to indicate thereto a number of transmitted groups.

6. A radio communication system as claimed in claim 5, further comprising an architecture of the TDMA type in conformity with which the radio frame is subdivided into time slots, means for computing a return delay representing the duration that separates a transmission instant of a time slot an the channel from a receiving instant of the time slot by said concentrator; wherein said concentrator further comprises means for processing said return delay on the channel, while any possible correction of the shift is taken into account.

7. A radio communication system as claimed in claim 2, wherein the operational data further comprise redundancy data, wherein the redundancy data makes it possible to detect a reception of erroneous packets, and wherein said radio base station further comprises means for processing an operational and maintenance data transmitted in cable frames, called channel error ratio, based upon a number of received erroneous groups and said processing means further for regularly transmitting the operational and maintenance data to said concentrator.

8. A radio station for use in a radio communication system that comprises a concentrator displaced from and connectable to said radio station, at least one terminal in communication with said radio station, means for said radio station to exchange radio frames at a first rate with said terminal, said radio frames comprising D1 bits, means for said concentrator to exchange channel frames at a second rate with said radio station, said channel frames comprising D2 bits, said radio frames being multiplexed on said channel frames and said ratio between the first rate and the second rate being equal to D1/D2, said radio station comprising:

means for reading said D1 bits in said radio frames, means for distributing said D1 bits over said D2 bits of said channel frame;

means for coding operational data with D2-D1 bits; and means for inserting a code bit of said operational data in said radio frame after a selected bit and prior to completely reading a subsequent bit.

9. A concentrator for use in a radio communication system that comprises a radio station displaced from and connectable to said concentrator and at least one terminal in communication with said radio station, means for said radio station to exchange radio frames at a first rate with said terminal, said radio frames comprising D1 bits, means for said concentrator to exchange channel frames at a second rate with said radio station, said channel frames comprising D2 bits, said radio frames being multiplexed on said channel frames and said ratio between the first rate and the second rate being equal to D1/D2, said concentrator comprising:

means for reading said D1 bits in said radio frames, means for distributing said D1 bits over said D2 bits of said channel frame;

means for coding operational data with D2-D1 bits; and means for inserting a code bit of said operational data in said radio frame after a selected bit and prior to completely reading a subsequent bit.

\* \* \* \* \*